United States Patent [19]

Laganis et al.

[11] Patent Number: 4,882,265

[45] Date of Patent: Nov. 21, 1989

[54] INFRARED LASER RECORDING FILM

[75] Inventors: Evan D. Laganis, Wilmington, Del.; Alden D. West, Hendersonville, N.C.

[73] Assignee: E. I. Du Pont de Nemours and Company, Wilmington, Del.

[21] Appl. No.: 195,231

[22] Filed: May 18, 1988

[51] Int. Cl.$^4$ ................................................ G03C 1/84
[52] U.S. Cl. .................................. 430/522; 430/581; 430/584; 430/944; 430/945
[58] Field of Search ............... 430/522, 581, 584, 944, 430/945

[56] References Cited

FOREIGN PATENT DOCUMENTS 0251282  1/1988  European Pat. Off. .

Primary Examiner—Paul R. Michl
Assistant Examiner—Thorl Chea

[57] ABSTRACT

A photographic element useful as a laser medical recording film, for example, is described. This element has near infrared sensitivity and is characterized by having an absorbing layer with an absorbing dye as described herein present as an antihalation backing layer.

6 Claims, No Drawings

INFRARED LASER RECORDING FILM

DESCRIPTION

1. Technical Field

This invention relates to photographic recording elements particularly useful for preparing a high quality medium for recording laser diode scanning systems. More particularly, this invention relates to a photographic recording element which is sensitive to near infrared light, processable in conventional chemistry and produces high quality images.

2. Discussion of the Prior Art

It is well-known to use an imaging processing technique based on the conversion of a visible image into electronic data by encoding the brightness of adjacent, small areas of said visible image. This is a useful technique since it is then possible to manipulate, transmit and store this electronic image. Not all of these steps can be employed with conventional imaging techniques. However, electronic data can be reconverted into visible images by means of a scanner system whereby a finely focussed beam of light is rapidly scanned across a light sensitive media using a succession of abutting raster lines, while modulating the intensity of the light so as to reproduce the required image densities based on the electronic signal produced thereby.

Systems that can record medical images from laser scanner cameras, for example, are well-known in the prior art and have been in commercial use for some time. Laser scanners can employ helium-neon as the gas lasing media, and these are particularly useful since they are extremely efficient to use, and have a long operational life time. However, there are other laser producing systems, e.g., laser diodes, that produce light in the infrared area of the spectrum and thus photosensitive elements used therewith must also be sensitive in this area. These laser diodes have a much longer operational life than gas lasers, are less expensive, and use space more efficiently.

It is well-known in the prior art to sensitize a photographic emulsion with a long chain cyanine dye, for example, to impart near infrared sensitivity thereto. There are a host of prior art dyes which fit in this category. However, many of these dyes impart a stain to the processed photograhic element and this is highly undesirable, especially when the element is to be used to produce images used in the medical field. Additionally, silver halide elements useful in recording images from infrared laser elements usually contain a backing layer having an absorbing dye to prevent scattering of light transmitted through the element. The absorbing of this scattered light is extremely important since this may produce unwanted exposure of the silver halide layer. The absorbing backing layer dyes of the prior art elements also produce some stain. If stain is produced with an element employed in the medical imaging area, for example, a misdiagnosis might occur and this is extremely undesirable, as can be imagined.

It has been found that the above disadvantages can be overcome and an improved silver halide photographic recording element prepared that is suitable for recording images from near infrared emitting laser scanner devices to which said element is highly sensitive and can be processed in conventional photographic chemistry with little or no residual dye stain.

SUMMARY OF THE INVENTION

In accordance with this invention there is provided a photographic recording element containing an infrared absorbing dye layer comprising a support, at least one silver halide layer coated on one side of the support, and coated on the other side of the support a hydrophilic binder layer containing an absorbing amount of a dye substantially water insoluble at ambient temperature with the following structure:

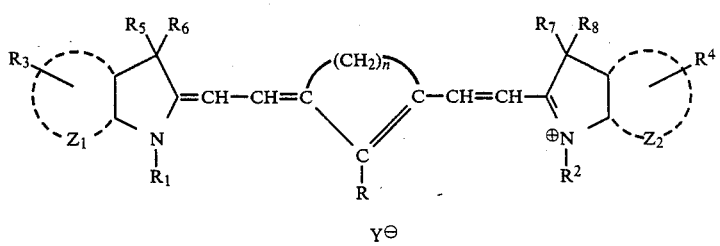

wherein R is hydrogen, alkyl, cycloalkyl, aryl, substituted aryl, F, Cl, or Br; $R_1$ and $R_2$ are independently $-(CH_2)_{n1}-X$ wherein X is H, F, Cl, Br, phenyl, methyl, ethyl, cycloalkyl of 3 to 7 carbon atoms or alkoxy of 1 to 3 carbon atoms, and $n_1$ is an integer of 2 to 6; $Z_1$ and $Z_2$ independently represent the atoms necessary to complete an indole, benzindole or naphthindole nucleus or R3 and R4 independently represent methyl, ethyl, methoxy, ethoxy, hydroxy, F, Cl or Br substitutions on $Z_1$ and $Z_2$, respectively; $R_5$, $R_6$, $R_7$ and $R_8$ each independently represent methyl, ethyl, or $R_5$ and $R_6$ or $R_7$ and $R_8$, when taken together with the carbon atoms to which they are attached may form a 5- or 6-membered cycloalkyl group; n is an integer from 2 to 4; and y is a counter ion.

DETAILED DESCRIPTION OF THE INVENTION

Dyes of the aforementioned structure, which absorb light in the near infrared region of the spectrum, e.g., in the spectral region of 700 to 900 nm, preferably 780 to about 830 nm, are useful in the photographic recording element. R in the above formula, in addition to being hydrogen, fluorine, chlorine or bromine, can also be alkyl, e.g., 1 to 6 carbon atoms, cycloalkyl, e.g., 3 to 7 carbon atoms, aryl, e.g., 6 to 10 carbon atoms, or substituted aryl, e.g., Br, Cl, F, alkyl of 1 to 3 carbon atoms or alkoxy of 1 to 3 carbon atoms. The counter ion can be, for example, Cl, Br, I, aryl or alkyl sulfonates, perfluoroalkyl or aryl, tetrafluoroborate, hexafluorophosphate, etc.

Known carbocyanine dyes useful as spectral sensitizers or dyes with infrared absorbing characteristics, require rather large dye loadings in order to function within the backing or antihalation layers of photographic elements useful as laser imaging elements. When these larger amounts of dye are present, as they are in the prior art elements, an increasing amount of dye stain is noted in the finished element. Surprisingly, the dyes matching the aforementioned structure useful in the photographic element of this invention can be present in minute amounts in the backing layer and provide the necessary spectral absorbing response with little or no dye stain in the processed photographic element obtained therefrom. The infrared absorbing dyes to be added to the backing layer opposite to the silver halide layer of the photographic element may be present in an amount of 0.005 to 0.05 g./m$^2$ and preferably in an amount of 0.01 to 0.03 g./m$^2$. This is surprising since previously these dyes were not thought to be useful in an antihalation backing layer for silver halide elements because they lack substantial water solubility at ambient temperature. Typical dye structures which exemplify, but do not limit the dyes useful in this invention, include the following:

TABLE 1

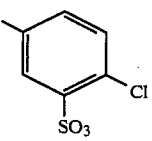

| Sample | Structure | | | Solubility Profile | | | |
|---|---|---|---|---|---|---|---|
| | n | R | Y | EtOH | MeOH | Acetone | H$_2$O |
| A | 3 | Cl | CF$_3$SO$_3$ | yes | yes | yes | no |
| B | 3 | Ph | CF$_3$SO$_3$ | yes | yes | yes | no |
| C | 3 | Me | I | yes | yes | yes | no |
| D | 2 | Cl | Cl-C$_6$H$_3$(Cl)-SO$_3$ | yes | yes | yes | no |
| E | 2 | Cl | CF$_3$SO$_3$ | yes | yes | yes | no |

The dyes of this invention, including Samples A to E, can be prepared following known procedures, e.g., as described in the following publications: Yu. L. Slominskii, I. D. Radchenko, and A. I. Tolmachev Zhur. Org. Khim., 14, 2214–21 (1978); Yu. L. Slominskii, I. D. Radchenko, and A. I. Tolmachev, Zhur. Org. Khim., 15, 400–407 (1979); and S. M. Makin, L. I. Boiko, and O. A. Shavrygina, Zhur. Org. Khim., 13, 1189 (1977).

These dyes can be dissolved in a suitable solvent, e.g., acetone/water, alcohol/water wherein the alcohol is methyl or ethyl; etc. and then added to an aqueous gelatin dispersion. This dispersion can also contain small amounts of other dyes and the usual gelatin hardeners, e.g. formaldehyde, glyoxal, etc. This mixture can then be used as an antihalation backing layer for a typical gelatino silver halide emulsion or hydrophilic colloid silver halide emulsion useful within the metes and bounds of this invention. Suitable silver halide emulsions include: silver bromide, silver iodide, or silver chloride, or mixtures thereof, etc. We prefer using a monodisperse AgIBr grain mixture with about 98.8 mol % Br and about 1.2 mol % I, the silver halide grains being comprised of a mixture of grains having a grains size of about 0.01 cubic micrometers (about 75%) and grains with a grain size of about 0.04 cubic micrometers (about 25%). Preferred emulsions are prepared from a mixture of grain sizes in order to better match a desired curve shape or contrast. The emulsions may be dispersed in gelatin or other hydrophilic colloid binder. For example, in place of gelatin other natural or synthetic water-permeable organic colloid binding agents can be used as a total or partial replacement thereof. Such agents include water permeable or water-soluble polyvinyl alcohol and its derivatives, e.g., partially hydrolyzed polyvinyl acetates, polyvinyl ethers, and acetals containing a large number of extralinear —CH$_2$-CHOH— groups; hydrolyzed interpolymers of vinyl acetate and unsaturated addition polymerizable compounds such as maleic anhydride, acrylic and methacrylic acid ethyl esters, and styrene. Suitable colloids of the last mentioned type are disclosed in U.S. Pat. Nos. 2,276,322, 2,276,323 and 2,347,811. Useful polyvinyl acetals include polyvinyl acetalaldehyde acetal, polyvinyl butylaldehyde acetal and polyvinyl sodium o-sulfobinzaldehyde acetal. Other useful hydrophilic colloid binding agents include the =poly-N-vinyllactams of Bolton U.S. Pat. No. 2,495,918, the hydrophilic copolymers of N-acrylamido alkyl betaines described in Shacklett U.S. Pat. No. 2,833,650 and hydrophilic cellulose ethers and esters. Phthalated gelatins may also be used as well as binder adjuvants useful for increasing covering power such as dextran or the modified, hydrolysed gelatins of Rakoczy, U.S. Pat. No. 3,778,278. The disclosures of the above United States Patents describing colloid binding agents are incorporated herein by reference.

After dispersing the silver halide in the binder, it is normally brought to its optimum sensitivity with gold and sulfur, for example, as is well known to those of normal skill in the art. Sulfur sensitizers include those which contain labile sulfur, e.g., allyl isothiocyanate, allyl diethyl thiourea, phenyl isothiocyanate and sodium thiosulfate, etc. The polyoxyalkylene ethers in Blake et al., U.S. Pat. No. 2,400,532, and the polyglycols disclosed in Blake et al., U.S. Pat. No. 2,423,549, are useful. Non-optical sensitizers such as amines as taught by Staud et al., U.S. Pat. No. 1,925,508 and Chambers et al., U.S. 3,026,203, and metal salts as taught by Baldsiefen, U.S. Pat. No. 2,540,086 may also be used. The disclosures of these United States Patents relating to silver halide sensitizers are incorporated herein by reference. The emulsions can contain known antifoggants, e.g., 6-nitrobenzimidazole, benzotriazole, triazaindenes, etc.; as well as the usual hardeners, e.g., chrome alum, formaldehyde, dimethylol urea, mucochloric acid, etc. Other emulsion adjuvants that may be added comprise matting agents, plasticizers, toners, optical brightening agents, surfactants, image color modifiers, non-halation dyes, and covering power adjuvants among others.

The film support for the emulsion layers may be any suitable transparent plastic. For example, the cellulosic supports, e.g., cellulose acetate, cellulose triacetate, cellulose mixed esters, etc. may be used, as can be polymerized vinyl compounds, e.g., copolymerized vinyl acetate and vinyl chloride, polystyrene, polymerized acrylates, etc. Preferred film supports include those formed from the polyesterification product of a dicarboxylic acid and a dihydric alcohol made according to the teachings of Alles, U.S. Pat. No. 2,779,684 and the patents referred to in the specification thereof. Other suitable supports are the polyethylene terephthalate/isophthalates of British Patent No. 766,290 and Canadian Patent No. 562,672 and those obtainable by condensing terephthalic acid and dimethyl terephthalate with propylene glycol, diethylene glycol, tetramethylene glycol or cyclohexane 1,4-dimethanol (hexahydro-p-xylene alcohol). The films of Bauer et al., U.S. Pat. No. 3,052,543 may also be used. The disclosures of the patents describing film supports are incorporated herein by reference. The above polyester films are particularly suitable because of their dimensional stability and may contain dyes to impart a tint thereto.

As previously mentioned, the photograhic elements of this invention are particularly useful for producing a hardcopy output, e.g., medical data, from images formed from an electronic modality. Types of equipment used to form these images are well known in the art and usually consist of component parts readily available. These parts can include, for example, an optical table designed to dampen ambient vibration and stabilize the optical line which in itself can consist of a layout designed to shape an emission beam from either a helium-neon or near infrared laser diode and to focus that beam on to a rotating, two facet mirror. The mirror can then sweep a sample mounted on a translation stage. As this stage translates, a raster field of scan lines is then exposed through the image. The translation stage may be driven by a stepper motor which can operate up to 10,000 steps/second, for example, which approximates smooth, linear motion. All of these components, and other components useful in simulating the formation of an electronic image for the evaluation of the photographic elements of this invention, among others, are well-known and described in detail in the art.

This invention will now be illustrated by, but not limited to, the following example wherein the percentages are be weight.

EXAMPLE 1

A 7% gelatin solution is made by cold soaking and then dissolving dry gelatin in water in a stainless steel kettle. Various additives are then added as the resulting solution shown below is cooled to 38° C. for appliation to a polyester substrate.

| GELATIN SOLUTION PROCESS OUTLINE | | |
|---|---|---|
| KETTLE ACTIVITY (with continuous stirring) | TIME (min.) | TEMP. (°C.) |
| Add deionized water | — | 22 |
| Add dry gelatin | 0 | 22 |
| Gelatin Cold-soak | 25 | 22 |
| Add Cyastat ® SN Cationic Antistat Agent Solution[1] | 25 | 22 |
| Heat to 60° C. | | |
| Gelatin Digestion | 50 | 60 |
| Begin Cooling | 70 | 60 |
| Add: Sodium Hydroxide Solution Saponin Nonionic Surfactant Solution[2]/Teflon ® Fluorocarbon Resin Dispersion[3] | 80 | 50 |
| Polymethylmethacrylate dispersion Triton ® X-100 Nonionic Surfactant[4] Deionized Water/3 A Alcohol Solution[5] | 81 | 49 |
| | 82 | 48 |
| Sample E Dye Solution | 83 | 47 |
| Cooled to 38° C. | 92 | 38 |

| AMOUNTS OF MATERIAL AND SOLUTION/DISPERSION CONCENTRATIONS | | |
|---|---|---|
| MATERIAL | AMOUNT/ BATCH (g) | CONCENTRATION AS ADDED |
| Deionized Water | 1,191,000 | — |
| Dry Gelatin | 100,000 | — |
| Cyastat ® SN Cationic Antistat Solution[1] | 125 | 50.0% in isopropyanol |
| Sodium Hydroxide | 4.61 | 0.615% in water |
| Saponin Nonionic Surfactant[2] | 1,790 | 50% in water |
| mixed with Teflon ® Fluorocarbon Resin Matte[3] | 390 | 60% in water |
| Polymethylmethacrylate Matte | 1,079 | 26% in water |
| Triton ® X-100 Nonionic Surfactant[4] | 150 | 10% in 50:50 3A alcohol:water |
| Deionized water mixed with | 40,000 | — |
| 3A Alcohol[5] | 37,500 | — |
| Sample E Dye Solution | 375 | 1% in 3A alcohol |

[1]Cyastat ® SN Cationic Antistat Agent is stearamidopropyldimethylammonium-⊖-hydroxyethyl-nitrate, American Cyanamid Co., Willow Island, West Virginia
[2]Saponin Nonionic Surfactant is a polysaccharide, 50% in water, Berghausen Corp., Cincinnati, OH
[3]Teflon ® Fluorocarbon Resin is polytetrafluoroethylene, 60% solids in water, E. I. du Pont de Nemours and Company, Wilmington, DE
[4]Triton ® X-100 Nonionic Surfactant is octylphenoxypolyethoxyethanol, Rohm & Haas, Philadelphia, PA
[5]3A alcohol is denatured alcohol, ethanol containing 4.4 to 5% methanol, Quantum Chemical, Tuscola, IL The above-prepared coating solution containing 7% gelatin in water is then applied to a 0.007 inch (0.18 mm) polyethylene terephthalate substrate suitably subbed as described in Alles U.S. Pat. No. 2,779,684 moving at 150 ft/minute via a standard photographic emulsion bar coater. Glyoxal hardener is injected into the gelatin solution to yield a level of 0.012 g glyoxal/g gelatin. The coated layer then passed through a spiral film dryer where cold air first sets the gelatin and then warm dry air removes the moisture and alcohol. The resulting antihalation layer contains 4.5 g gelatin/sq. meter.

A silver halide emulsion comprising grains of AgIBr (ca. 98.8 mol % bromide and ca. 1.2 mol % iodide) with a mixture of monodisperse grains of ca. 0.01 $\mu m^3$ (75%) and ca. 0.04 $\mu m^3$ (25%) is prepared in a small amount of gelatin and then redispersed in a larger amount of gelatin. After redispersion, this material is sensitized with gold and mercuric chloride and tetramethylthiuram monosulfide as well-known to those skilled in the art. Conventional antifoggants, stabilizers, and hardeners are then added along with a spectral sensitizing dye of the following structure:

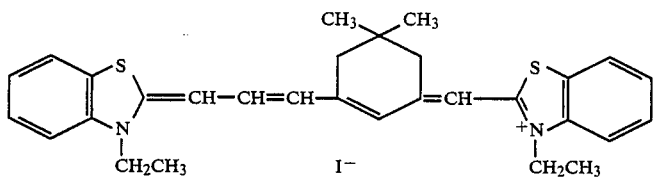

Benzothiazolium, 3-ethyl-2-[(3-[(3-(3-ethyl-2(3H)-benzothiazolylidene)-1-propenyl)-5,5-dimethyl-2-cyclohexane-1-ylidene]methyl]-,Iodide. This dye is dissolved in methanol (0.2 g/liter). When this solution is added to the aforementioned silver halide emulsion, and coated on the support, the dye is present at approximately $2.8 \times 10^{-4}$ g per square meter of support. The silver halide layer is coated at a coating weight of ca. 3.05 g of silver/sq meter on the opposite side of the support containing the aforementioned antihalation layer. A hardened gelatin antiabrasion layer containing a matte, e.g., polymethylmethacrylate, Teflon ® particles, or polyethylene beads, coated over the silver halide layer. The above film is exposed to an EGG sensitometer with a neutral density filter and a Wratten ® #87 filter to give a $10^{-3}$ exposure through a standard step-wedge target and is then developed in standard medical X-ray chemistry, fixed, washed and dried. The exposed film of the invention gives the required sensitometry with substantially no residual stain.

We claim:

1. A photographic recording element containing an infrared absorbing dye layer comprising a support, at least one silver halide layer coated on side of the support, and coated on the other side of the support a hydrophilic binder layer containing an absorbing amount of a dye substantially water insoluble at ambient temperature with the following structure:

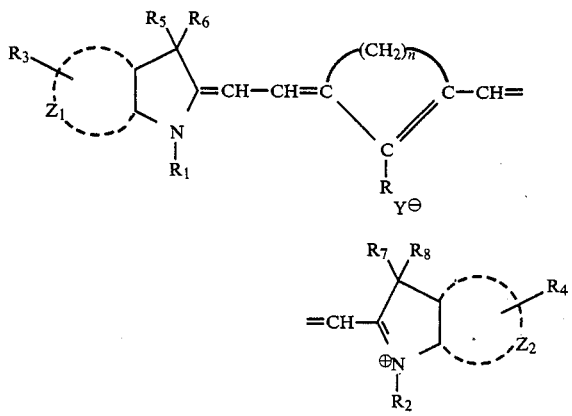

wherein R is hydrogen, alkyl, cycloalkyl, aryl, substituted aryl, F, Cl, or Br; $R_1$ and $R_2$ are independently $-(CH_2)_{n1}-X$ wherein X is H, F, Cl, Br, phenyl, methyl, ethyl, cycloalkyl of 3 to 7 carbon atoms or alkoxy of 1 to 3 carbon atoms, and $n_1$ is an integer of 2 to 6; $Z_1$ and $Z_2$ independently represent the atoms necessary to complete an indole, benzindole or naphthindole nucleus or R3 and R4 independently represent methyl, ethyl, methoxy, ethoxy, hydroxy, F, Cl or Br substitutions on $Z_1$ and $Z_2$, respectively; $R_5$, $R_6$, $R_7$ and $R_8$ each independently represent methyl, ethyl, or $R_5$ and $R_6$ or $R_7$ and $R_8$, when taken together with the carbon atoms to which they are attached may form a 5- or 6-membered cycloalkyl group; n is an integer from 2 to 4; and y is a counter ion.

2. An element according to claim 1 wherein the infrared absorbing dye is

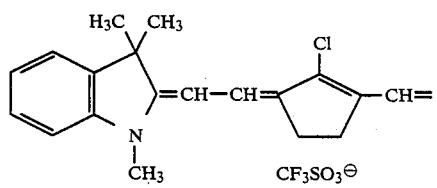

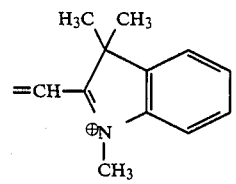

3. An element according to claim 1 wherein the dye is present in an amount of 0.005 to 0.05 g/m².

4. An element according to claim 2 wherein the dye is present in an amount of 0.005 to 0.05 g/m².

5. An element according to claim 1 wherein the silver halide layer contains a monodisperse AgIBr grain mixture with about 98.8 mol % Br and about 1.2 mol % I, the silver halide grains being comprised of a mixture of grains having a grains size of about 0.01 cubic micrometers and grains with a grain size of about 0.04 cubic micrometers.

6. An element according to claim 2 wherein the silver halide layer contains a monodisperse AgIBr grain mixture with about 98.8 mol % Br and about 1.2 mol % I, the silver halide grains being comprised of a mixture of grains having a grains size of about 0.01 cubic micrometers and grains with a grain size of about 0.04 cubic micrometers.

* * * * *